United States Patent Office 2,758,099
Patented Aug. 7, 1956

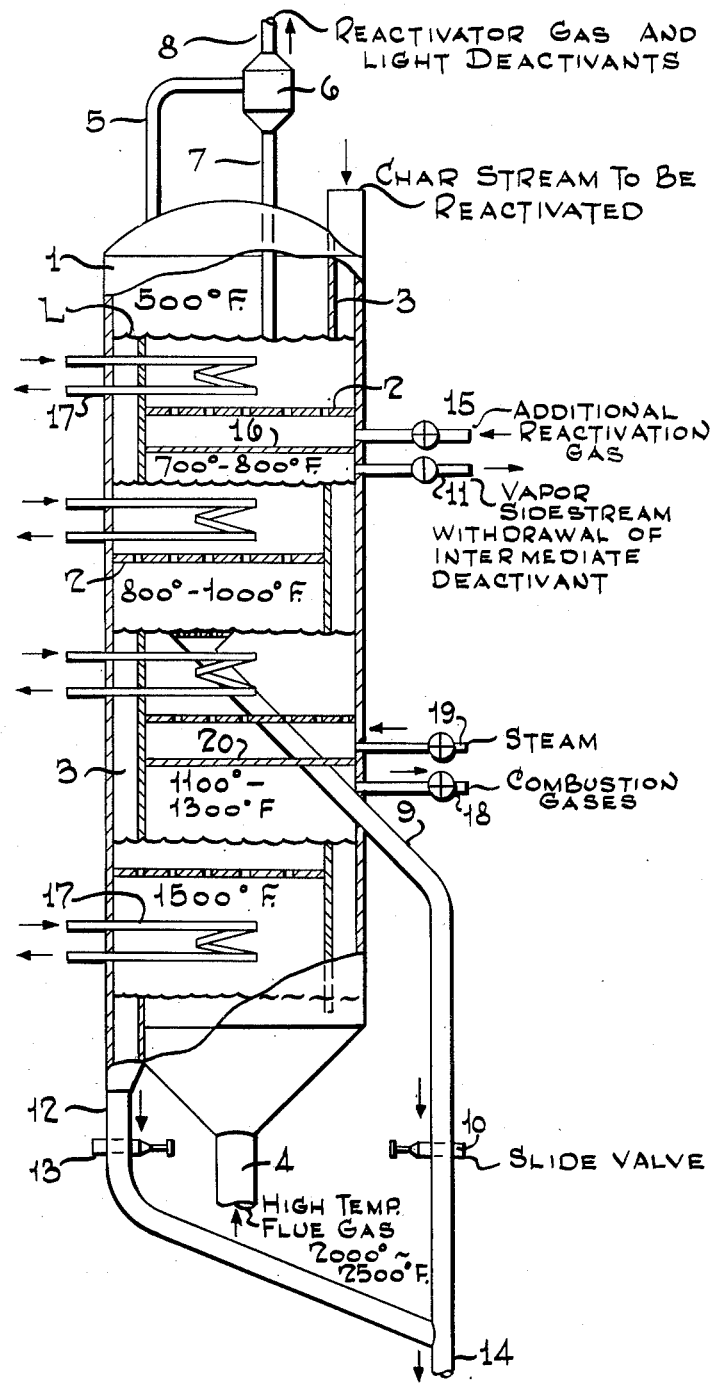

2,758,099

ADSORBENT REACTIVATION PROCESS

Lewis D. Etherington, Cranford, N. J., assignor to Esso Research and Engineering Company, a corporation of Delaware Application June 26, 1951, Serial No. 233,553

6 Claims. (Cl. 252—417)

This invention relates to an improved process for the reactivation of spent solid granular adsorbent employed in the separation of gaseous or liquid components of a mixture by means of an adsorption-desorption system. Particularly the invention is concerned with the reactivation of spent adsorbent by heat treatment at different temperature levels with or without attendant treatment with gases such as superheated steam, flue gas, $CO_2$, etc. More specifically the invention is concerned with an adsorbent reactivation process wherein the reactivation occurs at different temperature levels in the same zone with only a minor proportion of the adsorbent undergoing treatment at the higher reactivation temperatures.

The process of separating components of mixtures, both liquid and gaseous, by means of solid adsorbents has been well described. It is known that components of a mixture having varying degrees of adsorbability may be separated by contacting the mixture with a solid adsorbent whereby the more adsorbable component is adsorbed by the solid in preference to the less adsorbable component. The solid is then treated to recover the more adsorbable component therefrom in a process called desorption. The latter is usually accomplished by heat and/or stripping with steam or inert gas, or less usually by means of washing with a solvent for the adsorbed component.

It is well known that hydrocarbon mixtures, particularly gaseous mixtures, are separated into their components by treating them in intimate contact with solid adsorbents particularly activated carbon, silica gel, etc. In general it may be said that the activated carbons separate the hydrocarbons roughly by molecular weight, the higher molecular weight components of the hydrocarbon mixture being preferentially adsorbed by the carbon. On the other hand silica gel usually displays an affinity for the olefinic or more unsaturated hydrocarbons in preference to the less saturated or paraffinic type.

Recently a continuous process has been developed whereby hydrocarbon gases are separated into their components by countercurrently treating the gases with a finely-divided granular solid such as finely-divided activated carbon. In this process the granular solid containing adsorbed gases are generally heated and stripped with inert gases such as $N_2$, steam, etc., to recover the adsorbed fractions. This heating is accomplished usually by indirect heat exchange, the heating fluid being condensing Dowtherm vapors, combustion gases or the like. The bulk of the desorbed solid is cooled and returned to the adsorption zone to repeat the cycle. In the adsorption-desorption process it is necessary to continuously reactivate a small part of the circulating solid adsorbent to remove therefrom particularly highly adsorbable and physically-bound high molecular weight components, including polymeric and tar-like materials, which render the solid adsorbent inactivate for the separation desired. This reactivation is accomplished by passing a stream of the circulating solid to a reactivation zone where it is heated to a higher temperature and/or subjected to higher stripping gas/char ratio than prevailing in the desorption zone. Only a relatively small proportion of the total circulating solids is sent to the reactivation zone per adsorption-desorption cycle. Usually about 1 to 5% by weight of the solid is thus removed. Periodic or continuous regeneration of the solid to this extent is usually sufficient to maintain the solid at the activity desired. However, greater or lesser amounts are reactivated, depending upon the state of degradation of the char and upon the char contaminants present in the adsorber feed gas. High temperatures in the reactivation zone are attained by means of superheated steam, hot combustion gases, etc.

Reactivation of the char is usually effected by two mechanism: In the low and intermediate temperature sections of the reactivator, at 500–1000° F. for example, intermediate molecular weight deactivants are desorbed by the physical stripping action of the reactivator gas. This section may not remove any appreciable portion of the high molecular weight tar-like deactivating materials formed by polymerization or co-polymerization of unsaturated hydrocarbons. In the high temperature section of the reactivator, at 1200° F. to 1600° F., for example, there is a chemical reaction between polymeric deactivants and oxidizing constituents of the gas such as $H_2O$, $CO_2$ and $O_2$. This reaction gasifies the polymeric materials to liberate them from the carbon. At the same time, in particular if the carbon is reactivated to a high activity level, an appreciable portion of the base carbon may be lost due to the oxidizing action of the aforementioned reactivator gas components. If the carbon is reactivated to less degree, the residual layer of polymeric material not removed serves as protection for the char against oxidization loss. If the intermediate molecular weight or physically desorbable deactivants are not stripped from the char efficiently in the low and intermediate temperature reactivator sections, these deactivants on passing into the high temperature section will crack to form less desirable higher molecular weight materials which are more difficult to remove.

In copending application Serial Number 116,976, filed September 21, 1949, now Patent No. 2,684,731, issued July 27, 1954, and owned by applicant's assignee, there is described and claimed an adsorbent reactivation process in which the partially deactivated adsorbent is reactivated at two temperature levels.

It is an object of this invention to maintain the adsorbent at the desired activity level by carrying out the reactivation in such a manner that only a minor portion of the adsorbent undergoing reactivation is subjected to the higher reactivation temperatures.

Another object of this invention is to minimize the cracking of desorbable intermediate molecular weight adsorbent deactivants.

A further object of this invention is to recover the maximum practical amount of intermediate molecular weight deactivants which are valuable products.

It is also an object of this invention to carry out the reactivation of a deactivated adsorbent at different temperature levels simultaneously in the same equipment.

These and other objects of the invention are achieved by carrying out the process in the manner indicated from the following description and drawing which is a diagrammatic elevational view of one form of apparatus for carrying out the invention.

The process will be illustrated by the reactivation of charcoal employed in the separation by fractionation of $C_1$–$C_3$ hydrocarbons contained in admixture with higher molecular weight hydrocarbons including mono-olefins and diolefins. The latter give rise during the adsorption-desorption process to the formation of high molecular weight polymeric bodies which result from polymerization and copolymerization of the hydrocarbon components present in the feed to the adsorption system. With most hydrocarbon feed gases, more rapid deactivation of charcoal results however from adsorption of the heavier unpolymerized hydrocarbons ($C_5$, $C_6$, etc.) and from lower molecular weight polymers ($C_6$, $C_7$, etc.) than from the more difficultly removed heavy polymeric bodies. The deactivants comprising the lower molecular weight polymers and unpolymerized heavier hydrocarbons can be effectively desorbed physically by reactivator gas in the low and intermediate temperature reactivator sections. Consequently, a larger percentage of the circulating reactivator char stream should be reactivated to temperatures in the range of 500° F. to 1100° F. and only a smaller portion of the char need be continuously reactivated at temperatures above 1100° F. This is accomplished conveniently in one vessel according to this process, and is more economical than prior art processes which heat the total reactivator char stream to the higher reactivator temperature. In addition, with the smaller char stream to the high temperature reactivator section, it is less difficult to control the residual deposit of heavy polymeric bodies and thereby less difficult to protect the char against excessive oxidation loss.

Referring therefore to the drawing, numeral 1 represents an elongated reactivation vessel such as a fractionating column equipped with perforated plates 2, which retain the solid adsorbent at the desired level and which permit the upward passage of gas therethrough, and downcomers 3 which permit the passage of charcoal from the upper to the lower plates. The tower is equipped with as many plates as desired to secure the temperature gradient required in the tower. Progressively increasing temperatures prevail in the vessel 1 from the top plate to the bottom plate, ranging in the case of charcoal from about 500° F. to about 1600° F., preferably ranging from about 500° F. to 1500° F. If necessary, heating or cooling coils may be installed on one or more plates to insure the desired temperature control. Numeral 4 represents an inlet for hot gases, while exit pipe 8 is provided for the escape of spent gases and desorbed product which leave the uppermost plate via pipe 5 through cyclone 6. The cyclone is provided with a dip-leg 7 for return of entrained char to the reactivation zone. Pipe 9 is a draw-off for the major portion of the charcoal. This pipe connects with approximately the center or middle temperature area of the reactivation zone. Pipe 9 is equipped with a slide valve 10 which controls the flow of charcoal to return line 14. Similarly pipe 12 controlled by valve 13 provides for removal of the minor proportion of the circulating charcoal from the high temperature section of the reactivation zone. The two streams of reactivated char converging in return line 14 are conveyed by conventional means either to the desorber to supply heat for the desorption step, to a dehydrator, or to a cooler prior to re-use of the charcoal in the next adsorption-desorption cycle, preferably to the desorber.

In the reactivation process deactivated charcoal is removed from the desorber at about 400° F. to 500° F. and introduced into reactivation vessel 1 via uppermost downcomer 3. The charcoal builds up on the uppermost plate until the level L is exceeded whereupon it overflows into the downcomer to the next lower plate. The flow of the charcoal proceeds in this manner until the lowermost plate is reached. During the flow of the charcoal it countercurrently contacts hot gases, e. g. high temperature flue gases entering vessel 1 via line 4. This gas enters the vessel at a temperature in the neighborhood of 2000°–3000° F. As the hot gas proceeds up the vessel it imparts heat to the descending charcoal and removes from it the adsorbed heavy hydrocarbon components of the original gas feed and of the high molecular weight polymeric bodies both by physical desorption and by oxidization. In addition, the higher temperatures prevailing in the lowermost sections of vessel 1 may serve to open up new pores in the charcoal, particularly if oxidizing gases such as $CO_2$ or steam are present. As the charcoal descends in the reactivation vessel it becomes progressively hotter, all the time undergoing reactivation by the release from the pores thereof the highly bound adsorbed materials. The hot gases flowing up the vessel become progressively cooler due to loss of heat to the descending charcoal. In the middle of the vessel therefore is a zone of medium heat wherein the charcoal temperature is in the range of 700°–1100° F. At these temperatures the heavy unpolymerized hydrocarbon deactivants and lower molecular weight polymers are substantially removed from the charcoal. It has been found unnecessary therefore to subject all of the charcoal to the remaining high temperatures above 1100° F., which are required for removal of high molecular weight polymeric bodies and tarry material. The major portion of the charcoal therefore is removed from the vessel at the point where temperatures in the neighborhood of 700°–1100° F. prevail, while the remaining minor portion is allowed to continue its descent into the higher temperature regions where temperatures are sufficiently high, i. e., 1100°–1500° F., to remove the high molecular weight polymeric bodies from the char by oxidation with steam or $CO_2$. By this manner of operation the overall activity of the total circulating charcoal is kept at the desired activity level, charcoal losses caused by burning at excessively high reactivation temperatures, above 1100° F., are minimized, and maximum heat economy is realized.

Generally, about 60–80 wt. per cent, preferably about 75 wt. per cent of the charcoal circulating in vessel 1 is removed from the middle of the vessel via pipe 9. The rate of flow of this stream is controlled by slide valve 10 which regulates passage of the charcoal into return line 14. The balance of the charcoal, viz., 40–20 wt. per cent, preferably about 25 wt. per cent, passes downwardly from the middle temperature zone to the higher temperature zones and ultimately is removed from the last downcomer to pipe 12 controlled by slide valve 13. The two streams of charcoal enter line 14 where they are conveyed either to the desorber, to the dehydrator, or, after cooling, to the adsorption process proper, preferably to the desorber heating section for maximum heat economy. The temperature level at which the major portion of the charcoal is removed from the reactivator will vary with the degree of deactivation of the charcoal, however, it will generally lie in the temperature region of 700° F. to 1100° F., preferably 900° F. to 1000° F. Likewise the amount of charcoal allowed to pass into the high temperature reactivation zone will also vary with the state of deactivation, however, it will usually be an amount less than 50%, and more generally about 20–40 wt. per cent of the total charcoal fed to the reactivation vessel 1.

Another feature of the present invention is the withdrawal of at least one vapor sidestream product from at least one intermediate reactivator stage such as illustrated in the diagram by vapor withdrawal line 11. This operation prevents excess recycling within the reactivator of intermediate molecular weight deactivants ($C_7$, $C_8$, etc.) which are easily desorable at the intermediate reactivator temperatures but tend to be readsorbed at the lower reactivator temperature on the uppermost stage. Excessive internal recycling of these deactivants results in increased concentration of these materials on the char at the intermediate and higher reactivator temperatures, and, therefore, maximum cracking of said intermediate molecular weight deactivants. The cracked material is more difficult to remove from the char and is highly undesirable. If desired, the sidestream vapor withdrawn may be replaced with additional reactivator gas such as illustrated by reactivation gas addition line 15 in the drawing. To make the sidestream vapor withdrawal and reactivator gas replacement more effective, the additional plate 16 is provided which prevents mixing of vapors leaving in line 11 and entering in line 15. The vapor sidestream withdrawn may comprise all or a portion of the tower vapor at that point. In the former case, plate 16 is a solid plate and will not permit passage of vapor therethrough. The vapor sidestream feature will also serve to minimize internal recycling of sulfur and sulfur-containing deactivants and thereby minimize metal corrosion in the high temperature reactivator section.

The process of the drawing has been used for illustration purposes only and the invention is subject to numerous modifications without departing from the spirit of the invention. It is, for example, not necessary that the reactivation be carried out in the vessel described in the drawing, as other devices will serve to accomplish the same effect of subjecting the solid to progressively increasing temperatures and providing for removal of the bulk of the solid before the highest reactivation temperatures are reached.

For example, as another alternate, the reactivator heating may be effected indirectly with heating coils 17 in one or more stages and steam used as the reactivation gas. This modification would facilitate the recovery of desorbable deactivants as valuable products, namely, a low molecular weight fraction in the overhead fraction (e. g., $C_4$ and $C_5$) and an intermediate molecular weight fraction in the sidestream vapor withdrawn ($C_6$, $C_7$, $C_8$, etc.). Again, the reactivator gas leaving the higher temperature section may be withdrawn from the tower via line 18 and replaced with stream entering through line 19, which operation requires the additional solid plate 20. This operation would prevent contamination of the overhead and sidestream vapor products with oxidization products such as CO, $CO_2$ and $H_2$. As another alternate design, the high temperature oxidizing reactivator section may be separate from the intermediate and low temperature sections. Depending on the relative proportions of varying molecular weight deactivants of different degree of desorbability, more than one adsorbent sidestream from more than one intermediate stage may be withdrawn from the reactivator and returned to the adsorber-desorber, and additional vapor sidestreams may be withdrawn. Additional reactivator gas may be added at intermediate stages, and the tower diameter may be varied to parallel adsorbent and vapor rates in the adsorber, in order to minimize expensive high-temperature alloy metal requirements.

It is also possible, of course, to allow all the desorbed hydrocarbons to pass upwardly through the entire reactivation zone and be removed as one vapor stream with the reactivator gas through line 8. The various recovered products are then separated by suitable means such as fractionating, etc.

As another alternate design, only two temperature zones or stages may be used. For example, if the bulk of the desorbable deactivants fall within a narrow boiling range, one reactivator desorption stage at the lower temperature combined with one oxidation stage at the higher temperature will be sufficient, and the bulk of the reactivator char would be removed from the low temperature reactivator stage and returned directly to the adsorber-desorber system. This alternate would apply particularly when indirect heating is used in the lower temperature reactivator stage which provides a more convenient control of the temperature of said stage.

The process may be carried out employing the adsorbent in the fluidized state, utilizing bubble plates, perforated plates, packing or baffles to provide staging. Also a soaking-type operation may be employed in which the hot gases flow upwardly through a slowly gravitating bed of granular solid adsorbent.

Having described the invention in a manner such that it may be practiced by those skilled in the art, what is claimed is:

1. A process for reactivating finely divided deactivated carbon particles contaminated with light, intermediate and heavy hydrocarbon deactivants which accumulate on the carbon particles after passage through a cyclic adsorption-desorption system, which process comprises passing said deactivated carbon particles in a fluidized state and in successive order downwardly through a low temperature reactivation section maintained between about 400° and 700° F., an intermediate temperature reactivation section maintained between about 700° and 1100° F., withdrawing a major portion of the descending carbon particles from a lower portion of the intermediate reactivation section after removal of the light and intermediate deactivants for return of the thus withdrawn incompletely reactivated particles to the adsorption-desorption system, passing the remaining minor portion of the carbon particles from the intermediate temperature section downwardly through a high temperature reactivation section maintained between about 1100 and 1600° F. for removing the heavy deactivants from this minor portion of carbon particles, passing a hot reactivation gas upwardly through the high temperature and intermediate temperature reactivation sections in countercurrent relation to the descending carbon particles while subjecting the descending particles to progressively increasing temperatures, withdrawing a stream of reactivation gas and liberated deactivants from an upper portion of the low temperature reactivation section, withdrawing a vapor stream of reactivation gas and relatively heavy hydrocarbon deactivants from the intermediate temperature reactivation section, replacing the withdrawn vapor by separate addition of further reactivation gas to the intermediate reactivation section, passing this added gas upwardly through the descending fluidized carbon particles in the low temperature reactivation section, and withdrawing the resulting relatively completed reactivated minor portion of carbon particles from a lower portion of the high temperature reactivation section for return to the adsorption-desorption cycle.

2. A process according to claim 1 in which 60–80 wt. per cent of the carbon is removed from the intermediate temperature section of the reactivation zone and in which the balance of the carbon passes through the high temperature section.

3. A process according to claim 1 in which the heavy hydrocarbon deactivants are also recovered as a vapor stream from the high temperature section of the reactivation zone and the heavy deactivant-containing vapor is replaced by addition of further reactivation gas.

4. A process according to claim 3 in which the carbon is heated in the high temperature section by contact of the carbon with hot combustion gases.

5. A process according to claim 1 in which the carbon is heated in the low temperature and median temperature sections by means of steam and in the high temperature section by means of hot flue gas.

6. A process according to claim 1 in which the carbon is heated by contact with superheated steam.

References Cited in the file of this patent

UNITED STATES PATENTS

| | | |
|---|---|---|
| 1,619,327 | Backhaus | Mar. 1, 1927 |
| 2,416,214 | Payne | Feb. 18, 1947 |
| 2,438,467 | Tyson et al. | Mar. 23, 1948 |
| 2,506,542 | Caldwell et al. | May 2, 1950 |
| 2,561,331 | Barker | July 24, 1951 |
| 2,567,207 | Hoge | Sept. 11, 1951 |
| 2,648,731 | Starr et al. | July 27, 1954 |
| 2,692,656 | Berg | Oct. 26, 1954 |